United States Patent

[11] 3,545,585

[72] Inventor John L. Eaton, Jr.
Delanco, New Jersey
[21] Appl. No. 814,968
[22] Filed April 10, 1969
[45] Patented Dec. 8, 1970
[73] Assignee Proctor-Silex Incorporated
Philadelphia, Pennsylvania
a corporation of New York

[54] CENTRIFUGALLY INTERLOCKED COUPLING
4 Claims, 4 Drawing Figs.

[52] U.S. Cl............................................. 192/108;
64/14; 192/103 192/55, 192/114
[51] Int. Cl......................................... F16d 11/04
[50] Field of Search............................... 192/108,
105(B—1), 103(A), 103(B), 114, 67, 55, 65

[56] References Cited
UNITED STATES PATENTS
3,461,746 8/1969 Schwerdhofer .......... 74/752(B1)

1,710,174 4/1929 Mauvillier............ ......192/105(B—1)
2,179,837 11/1939 Wolkoff.................... 192/65X
2,664,982 1/1954 Orzabal..................192/105(B—1)

FOREIGN PATENTS
720,168 12/1954 Great Britain............192/105(B-1)UX

Primary Examiner—Benjamin W. Wyche
Attorney—Robert S. Vermut

ABSTRACT: A coupling for a pair of alined shafts comprising male and female members, the male member having a base element connectable to one of the shafts and at least one resilient protrusion extending from the base element, and the female member having a hub element connectable to the other of the shafts and an internal surface connected to the hub element, the at least one protrusion of the male member being forced into contact with the internal surface of the female member during rotation with a resultant vertical force component acting on the female member in a direction to more firmly hold the coupling members together and the shafts in stable alinement.

PATENTED DEC 8 1970 3,545,585

INVENTOR
JOHN L. EATON, JR.
BY Robert S. Vermut
ATTORNEY

CENTRIFUGALLY INTERLOCKED COUPLING

BACKGROUND OF THE INVENTION

1. Field of the Invention

This invention relates to the field of couplings for related, rotatable shafts. More particularly, the invention relates to a coupling for the drive motor shaft and driven blade shaft of a blender.

2. Description of the Prior Art

In the particular field of blenders wherein, typically, a motor drive shaft will extend from the blender base to be releasably coupled to the driven blade shaft which extends from the blender jar, there has been a need for a coupling for the aligned shafts which will provide ease of assembly and disassembly of the jar to the base, and a stable relationship between the jar and the base during rotation without jar bounce or substantial deleterious vibration.

The most pertinent prior art in this area is U.S. Pat. No. 2,992,715 issued to D. L. Blachly on July 18, 1961 and U.S. Pat. No. 3,064,949 issued to H. A. Dewenter on Nov. 20, 1962. Each of these patents and the prior art in general disclose blenders which do not overcome the bounce and vibration problems while attempting to provide ease of assembly and disassembly of blender jar and base. The reason for this is that the prior art has utilized a female coupling member which tends to separate from the male coupling member as certain resilient portions of the male member are forced against the inner surface and top edge of the female member.

SUMMARY OF THE INVENTION

This invention relates to the utilization of the beneficial effects of the centrifugal forces which arise from the rotation of a coupling for related, rotatable shafts. More particularly, this invention is directed toward the relationship of male and female coupling members wherein the male member has at least one resilient protrusion which is forced into contact with a surface of the female member on rotation with a resultant vertical force component acting on the female member in a direction to more firmly hold the coupling members together.

It is therefore an object of the present invention to provide a coupling for related rotatable shafts which maintains a firm stable relation between the shafts.

It is also an object of the present invention to provide a blender coupling for the drive motor shaft and driven blade shaft which precludes jar bounce and deleterious vibrations.

It is also an object of the present invention to provide a blender coupling which facilitates assembly and disassembly of the blender jar and base.

These and other objects, features and advantages will become more apparent when reading the following description and claims in the light of the accompanying drawing.

DESCRIPTION OF THE PREFERRED EMBODIMENT

Figure 1:
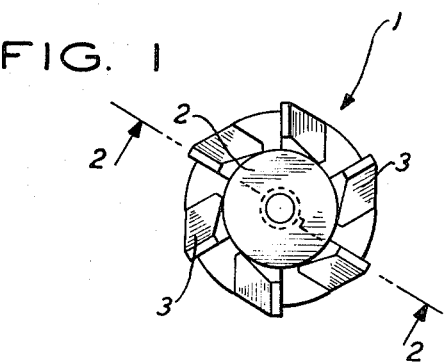
FIG. 1 is a plan view of the male coupling member.

Referring now more particularly to the drawing with reference numerals, in FIG. 1, the male coupling member is generally designated at 1 and comprises a base element 2 and a plurality of resilient protrusions 3, preferably molded integrally with the base of a rubber composition and extending therefrom. The base element 2 includes a reinforcing plate, not shown, preferably made of steel which has a concentric aperture through it to threadedly receive the driven blade shaft 9. The reinforcing plate may be molded into the male coupling member or embedded by other means which will provide a fixed relation without slippage between the plate and male member.

Figure 2:
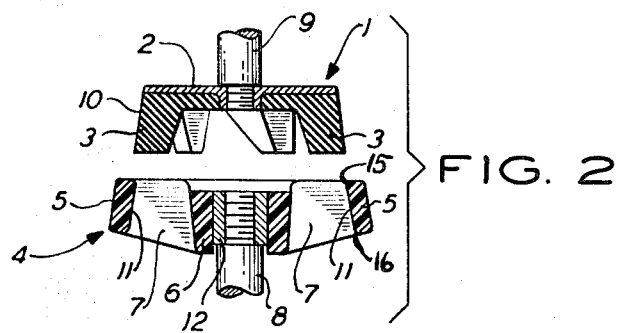
FIG. 2 is a cross-sectional view of the male and female coupling members before interrelationship where the male coupling member cross section is taken along line 2-2 of FIG. 1 and the female coupling member cross section is taken along line 2-2 of FIG. 3.
Figure 3:
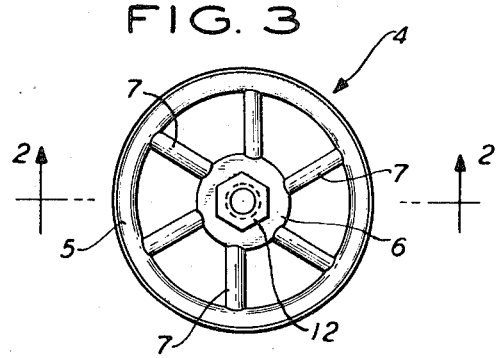
FIG. 3 is a plan view of the female coupling member.

The female coupling member shown in FIG. 3 comprises a wheel-type member generally designated at 4 which comprises a rim element 5, a hub element 6 and a plurality of spokes 7 extending between the hub element 6 and the rim element 5. The female coupling member is preferably made of molded nylon and has concentric aluminum insert 12 in the hub element 6 with a concentric threaded aperture therethrough to provide a means for threaded engagement with the drive motor shaft 8 as shown in FIG. 2. It will thus be noted from the materials mentioned hereinabove that the male coupling member is substantially resilient and the female coupling member is substantially rigid.

In FIG. 2, cross-sectional views of both the male and female coupling members are shown prior to interrelation. These views taken along line 2-2 of FIG. 1 and line 2-2 of FIG. 3, respectively, show the intended initial relationship between the protrusions 3 and the rim element 5.

As can be seen in FIG. 2, the protrusions have an exterior surface 10 extending outwardly and away from the shaft 9 in a divergent manner from the engaged shaft and at, approximately, an angle of 5 degrees to the axis of the shaft 9. The rim element 5, on the other hand, has an internal surface 11 which, in the preferred embodiment, converges toward the male member at an angle of approximately 5 degrees to the axis of the shaft 8. Thus, edge 15 of surface 11 which edge is most adjacent the male member and its shaft 9 is closer to the axis of the female member than is edge 16.

Before rotation of the coupling there is clearance between the protrusions 3 and the rim element 5 although the outer surface 10 and the inner surface 11 are in apparent parallel relationship.

Figure 4:
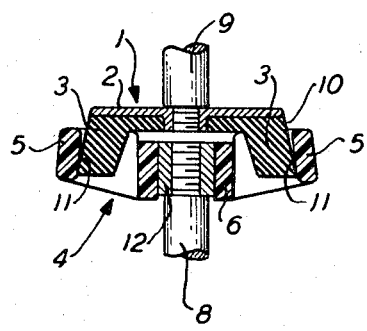
FIG. 4 is a cross-sectional view similar in nature to the cross-sectional view shown in FIG. 2 but with the male and female coupling members interrelated and undergoing rotation.

Looking now to FIG. 4, the substantially improved result of the present invention can be readily seen. Here, as the coupling rotates, the resilient male member protrusions 3 are forced outwardly into contact with the inner surface 11 of the rim element 5 and, in such contact, exert, in a direction away from the male coupling member and perpendicular to the rigid inner surface 11, a force substantially equivalent to the centrifugal force arising from the rotation of the protrusions 3. The force acting on the surface 11 can be reduced to its vertical and horizontal components, the vertical component acting in a direction toward the shaft 9. The latter force component maintains the male and female coupling members together during rotative operation and thus maintains the blender jar and base to which there respective shafts are attached in a stable condition without jar bounce and deleterious vibrations.

It should be noted here that the present invention is founded on presenting the contacted member surfae—which is less displaced by centrifugal force and is, therefore, contacted by the other more displaced member surface on rotation—with an edge most adjacent the contacting member and its respective shaft which edge is closer to the contacted member axis than some other point on the contacted member surface. Thus, surface 11 might be vertical in FIG. 2 with an annular groove into which a part of the protrusion 3 might be forced on rotation. In the latter embodiment, the contacted surface edge most adjacent the contacting member and its shaft would be closer to the contacted member axis than the inner groove surface part of the contacted surface.

Referring to the preferred embodiment of FIG. 2 before rotation, the contacting surface 10 need not be at the angle shown but could be inwardly angled as long as the protrusions were of sufficient resiliency to provide, on rotation, contact along a part of the length of contacted surface 11. The surface 11 of the preferred embodiment, on the other hand, must converge toward shaft 9 to provide the proper force vector toward the shaft 9 but could also include an annular groove as discussed above with a complementary projection on the protrusions 3 to fit in the groove on rotation to even more firmly hold the shafts in stable relationship. It also should be here noted that the present invention applies to coaxial shafts as well as aligned shafts.

As can be seen in the prior art mentioned hereinabove, neither of the patents cited nor the prior art in general show a relationship between male and female coupling members which utilizes the beneficial effects of the centrifugal forces created by rotation of the male coupling member to give rise to a locking effect such as a force vector acting on the female coupling member which is directed toward the driven blade shaft to hold the shaft in stable alignment.

The coupling of the present invention has actually been reduced to practice and, in testing, has demonstrated the substantially improved result over the prior art in accomplishing stability of a blender construction. The test, as opposed as to what could not be done with blender constructions of the prior art, involved the holding of the blender construction by the base in inverted and horizontal positions without the blender jar becoming at all dislocated from the base.

Thus it can be seen that in blender and other constructions which present related, rotatable shafts, the application of the present invention will substantially increase the stability of the shaft relationship and, particularly with relation to blender constructions where facile separability is required, substantially reduce the possibility of jar bounce and undesirable vibrations.

Since the preferred embodiment may be modified, e.g. by changing the relative resiliency of the male and female members; by changing the prerotation angles of the respective male and female member outer and internal surfaces; by making the male member of rigid material with hinge means connecting protrusions 3 to base element 2 et cetera, the preferred embodiment should be viewed as illustrative and not in a limiting sense.

I claim:

1. A coupling for a pair of shaft means comprising a first member having a portion engaging one of said pair of shaft means and a contacting portion connected to said shaft means engaging portion and forcibly movable at least in part with respect thereto, said contacting portion having first surface means, and a second member having a portion engaging the other of said pair of shaft means and a contacted portion connected to the shaft means engaging portion of said second member, the contacted portion having second surface means adjacent said first surface means, one of said first and second surface means facing substantially outwardly and the other facing substantially inwardly in relation to their respective member axes, said second surface means being at an angle to the axis of said second member and converging toward the shaft means engaged by said first member, the first surface means being forcibly moved at least in part against the second surface means on rotation of the first and second members and thereby creating a force component acting on the second member which tends to maintain the first and second members together, said second member shaft means engaging portion being a hub element and the contacted portion comprising a rim element which is connected to the hub element by a plurality of spokes, said second surface means being the internal surface of the rim element, said first member shaft means engaging portion being a base element and the contacting portion comprising a plurality of resilient protrusions extending from the base element into the openings defined by the rim element, spokes, and hub element, said first surface means being the combined outer surfaces of the protrusions.

2. A coupling for a pair of shaft means comprising a first member having a shaft means engaging portion and a contacting portion connected to said shaft means engaging portion and forcibly movable at least in part with respect thereto, said contacting portion having first surface means, and a second member having a shaft means engaging portion and a contacted portion connected to the shaft means engaging portion of said second member, the contacted portion having second surface means adjacent said first surface means, one of said first and second surface means facing substantially outwardly and the other facing substantially inwardly in relation to their respective member axes, said second surface means being at an angle to the axis of said second member and converging toward the axis of said first member, the first surface means being forcibly moved at least in part against the second surface means on rotation of the first and second members, thereby creating a force component acting on the second member which tends to maintain the first and second members together, said second member shaft means engaging portion being a hub element and the contacted portion comprising a rim element which is connected to the hub element by a plurality of spokes, said second surface means being the internal surface of the rim element, said first member shaft means engaging portion being a base element and the contacting portion comprising a plurality of resilient protrusions extending from the base element into the openings defined by the rim element, spokes, and hub element, said first surface means being the combined outer surfaces of the protrusions.

3. A coupling for a pair of shaft means comprising a first member having a portion engaging one of the pair of shaft means and a contacting portion connected to said shaft means engaging portion and forcibly movable at least in part in respect thereto, said contacting portion having first surface means, and a second member having a portion engaging the other of said pair of shaft means and a contacted portion connected to the shaft means engaging portion of said second member, the contacted portion having second surface means adjacent to said first surface means, one of said first and second surface means facing substantially outwardly and the other facing substantially inwardly in relation to their respective member axes, said second surface means having its edge which is most adjacent to the shaft means engaging the first member, being closer to the axis of the second member than at least a part of said second surface means, the first surface means being forcibly moved at least in part against said part of the second surface means on rotation of the first and second members thereby maintaining the first and second members more firmly together, said second member shaft means engaging portion being a hub element and the contacted portion comprising a rim element which is connected to the hub element by a plurality of spoke elements, said second surface means being the internal surface of the rim element, said first member shaft means engaging portion is a base element and the contacting portion comprises a plurality of resilient protrusions extending from the base element into the openings defined by the rim element, spoke elements and hub element, said first surface means being the combined outer surfaces of the protrusions.

4. A coupling for a pair of shaft means comprising a first member having a shaft engaging portion and a contacting portion connected to the shaft means engaging portion and forcibly movable at least in part with respect thereto, said contacting portion having first surface means, and a second member having a shaft means engaging portion and a contacted portion connected to the shaft means engaging portion of said second member, the contacted portion having second surface means adjacent said first surface means, one of said first and second surface means facing substantially outwardly and the other facing substantially inwardly in relation to their respective member axes, said contacting portion having male means and said second member having female means, said male means being inserted within said female means, said second surface means having its edge most adjacent the initial point of insertion of the male means into the female means being closer to the second member axis than at least a part of said second surface means, the first surface means being forcibly moved at least in part against said part of said second surface means to thereby maintain the first and second members more firmly together on rotation of said first and second members, said second member shaft means engaging portion being a hub element and the contacted portion comprising a rim element which is connected to the hub element by a plurality of spoke elements, said second surface means being the internal surface of the rim element, said first member shaft means engaging portion is a base element and the contacting portion comprises a plurality of resilient protrusions extending from the base element into the openings defined by the rim element, spoke elements and hub element, said first surface means being the combined outer surfaces of the protrusions.